United States Patent [19]
Wehler et al.

[11] Patent Number: 5,257,961
[45] Date of Patent: Nov. 2, 1993

[54] GUIDE CHANNEL FOR RECEIVING AND GUIDING GUIDE CHAINS FOR ENERGY LINES

[75] Inventors: Herbert Wehler, Neunkirchen; Willibald Weber, Netphen, both of Fed. Rep. of Germany

[73] Assignee: Kabelschlepp Gesellschaft mit beschränkter Haftung, Siegen, Fed. Rep. of Germany

[21] Appl. No.: 989,071

[22] Filed: Dec. 11, 1992

[30] Foreign Application Priority Data

Dec. 12, 1991 [DE] Fed. Rep. of Germany ....... 4140910

[51] Int. Cl.$^5$ .............................................. F16H 7/18
[52] U.S. Cl. .................................................. 474/144
[58] Field of Search .................... 474/140, 144–147

[56] References Cited

U.S. PATENT DOCUMENTS

| | | |
|---|---|---|
| 2,912,882 | 11/1959 | Wilson ............................... 474/144 |
| 3,343,880 | 9/1967 | Hauschopp ..................... 474/146 X |

FOREIGN PATENT DOCUMENTS

3300495 1/1983 Fed. Rep. of Germany .
8811440 9/1988 Fed. Rep. of Germany .

*Primary Examiner*—Thuy M. Bui
*Attorney, Agent, or Firm*—Robert W. Becker & Associates

[57] ABSTRACT

A guide channel for receiving and guiding guide chains for energy lines has a bottom that is divided in the longitudinal direction and has a width that is adjustable to varying sizes of guide chains to be guided. The guide channel is assembled from a system of prefabricated parts. Channel sidewalls of varying heights are provided. The bottom is comprised of two profiled carrier elements having a meander-shaped profile that, in the longitudinal direction, are arranged in a mirror-symmetrical arrangement relative to one another in a common horizontal plane. Each profiled carrier element is comprised of three U-shaped profiles. A first and a second one of the U-shaped profiles are open in an upward direction, and a third one of the U-shaped profiles is open in a downward direction. The third U-shaped profile is connected between the first and the second U-shaped profiles. The first U-shaped profile is positioned outwardly relative to the mirror-symmetrical arrangement, and the channel sidewalls are inserted into the first U-shaped profile.

42 Claims, 7 Drawing Sheets

GUIDE CHANNEL FOR RECEIVING AND GUIDING GUIDE CHAINS FOR ENERGY LINES

BACKGROUND OF THE INVENTION

The present invention relates to a guide channel for receiving and guiding guide chains for energy lines. The guide channels have a bottom that is divided in the longitudinal direction of the channel and has a width that is adjustable to the size of the guide chains to be guided.

From German patent 33 00 495 a guide channel device with an essentially H-shaped cross-section is known. With this known guide channel device individual sections of the guide channel device can be adjusted by a 180° rotation about their longitudinal axis for receiving guide chains of different heights and by inserting various intermediate pieces between the side portions. However, the adjustment to only two heights of guide chains is insufficient for practical purposes, and the mounting of the intermediate pieces and the corresponding threaded pins is very cumbersome.

It is therefore an object of the present invention to provide a system of prefabricated parts for assembling guide channels for guiding chains for energy lines of various sizes.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

The guide channel for receiving and guiding guide chains for energy lines according to the present invention is primarily characterized by:

A bottom, divided in a longitudinal direction and having a width adjustable to the size of the guide chains;

Channel sidewalls of varying heights;

The bottom comprised of two profiled carrier elements having a meander-shaped profile and in the longitudinal direction arranged in a mirror-symmetrical arrangement relative to one another in a common horizontal plane; and Each profiled carrier element comprised of three U-shaped profiles, with a first and a second one of the U-shaped profiles open in an upward direction and a third one of the U-shaped profiles open in a downward direction, the third U-shaped profile connected between the first and the second U-shaped profiles and the first U-shaped profile positioned outwardly relative to the mirror-symmetrical arrangement, with the channel sidewalls inserted into the first U-shaped profiles.

According to a preferred embodiment of the present invention, the first U-shaped profile has a first outwardly positioned leg and a second inwardly positioned leg defining therebetween a wedge-shaped groove for receiving the channel sidewalls, with the first leg having an outwardly slanted inner wall thus creating the wedge-shape of the groove. The guide channel further comprises wedges for fastening the channel sidewalls in the wedge-shaped groove, the wedges having a first straight lateral face with downwardly extending barbs and a second lateral face matching the outwardly slanted inner wall of the first leg. The channel sidewalls may be fastened within the wedge-shaped grooves such that abutting free ends of adjacent ones of the profiled carrier elements are bridged in the longitudinal direction.

Preferably the length of individual ones of the channel sidewalls is identical to the length of individual ones of the profiled carrier elements.

Preferably, the first leg has a cutout on an inwardly oriented side thereof at a base of the first leg. This cutout allows for a slide elastic movement of the first leg to thereby facilitate the insertion of the channel sidewalls.

The wedge-shaped groove is designed such that it is suited for receiving channel sidewalls of varying thickness, height and materials. Channel sidewalls of varying thickness are fastened within the wedge-shaped groove by wedges having a shape corresponding to the shape of the wedge-shaped groove. Depending on the thickness of the channel sidewall the wedges are inserted to different depths into the grooves.

In another embodiment of the present invention, the first U-shaped profile further comprises a support surface connected to the outwardly facing wall of the outwardly positioned leg. Preferably, the support surface has a shallow groove extending parallel to the lateral walls of the groove. The support surface increases the stability of the carrier element on surfaces and also possible fastening means for attaching the carrier element to a base, whereby the shallow groove facilitates the alignment of required bores.

Expediently, the groove has lateral walls for receiving the channel sidewalls. The lateral walls preferably have inwardly pointing barbs. One of the lateral walls neighboring the third U-shaped groove has a recess at the upper end of the lateral wall. In the alternative one of the lateral walls adjacent to the third U-shaped groove has a vertical groove at the upper end of the lateral wall.

Preferably, each of the second and the third U-shaped profiles has inner sidewalls with undercuts, the inner sidewalls facing one another.

The undercuts receive screws and nuts of connectors of the guide chains for connecting the connectors to the profiled carrier elements, or, in an alternative the undercuts receive screws and nuts for connecting the profiled carrier elements to a base.

In a further embodiment of the present invention, the guide channel further comprises a bottom cover plate connected between the second U-shaped profiles, and wherein each of the second U-shaped profiles has a first leg and a second leg, the first leg facing inwardly relative to the mirror-symmetrical arrangement and having a groove with inner walls for receiving the bottom cover plate. The bottom cover plate is preferably made of a material selected from the group consisting of steel, aluminum, and a composite material. Preferably, the bottom cover plate is comprised of a plurality of layers of aluminum, wherein the layers of aluminum are preferably thin flat cover layers and a corrugated aluminum core. The inner walls of the groove are preferably provided with inwardly pointing barbs.

Expediently, the channel sidewalls are made of a material selected from the group consisting of steel, aluminum, and composite material. The channel sidewalls are preferably comprised of a plurality of layers of aluminum, wherein the layers of aluminum are expediently thin flat cover layers and a corrugated (wave-shaped) aluminum core. The composite material comprises thin cover plates and a plastic core connected between the cover plates. The thin cover plates are preferably made from aluminum, and the plastic core is preferably made of polyethylene.

In another embodiment of the present invention, the channel sidewalls have outwardly bent free upper ends, and the guide channel further comprises U-shaped terminal elements connected to the free upper ends.

When the freely supported length of the guide chain is surpassed, the upper portion of the guide chain bears on the lower portion of the guide chain. When the upper portion extends past the connector of the guide chain the upper portion is supported on a U-shaped support. This support is connected to the third U-shaped profile.

The third U-shaped profile comprises a transverse bar, and the guide channel further comprises a U-shaped support with a first leg portion and a second leg portion and a bottom portion, the U-shaped support connected to the transverse bar. The interior of the U-shaped support has undercuts at the bottom portion.

The guide channel preferably further comprises an approximately T-shaped guiding profile inserted into the undercuts of the U-shaped support. The T-shaped guiding profile has horizontal arms and a vertical stem, the horizontal arms connected to the vertical stem so as to be staggered vertically. The lower arm can thus be introduced into the undercut portion, while the upper arm is flush with the glide surface. The T-shaped guiding profile further comprises a downwardly slanted guiding surface connected to the upper one of the horizontal arms. The guiding surface facilitates the gliding of the upper portion of the guide chain onto the support and prevents the arrangement of abutting edges between neighboring supports.

Preferably, the first leg portion of the U-shaped support is shorter than the second leg portion. In a first embodiment, the first U-shaped profile has a first leg and a second leg defining therebetween a groove with lateral walls for receiving the channel sidewalls, one of the lateral walls neighboring the third U-shaped groove having a recess at the upper end of the lateral wall; the second U-shaped profile has an inner bottom surface and inner sidewalls with undercuts, the inner sidewalls facing one another; and the first leg portion of the U-shaped support at a free end thereof has a projection and the second leg portion of the U-shaped support at an inner side thereof has a catch, wherein the projection engages the recess and the catch engages the undercuts and whereby the second leg portion rests on the bottom surface. The catch may be in the form of a bead portion or of an arresting hook.

In a second alternative, the first U-shaped profile has a first leg and a second leg defining therebetween a groove with lateral walls for receiving the channel sidewalls, wherein one of the lateral walls neighboring the third U-shaped groove has a vertical groove at the upper end of the lateral wall, and the first leg portion of the U-shaped support at a free end thereof has a recessed portion engaging the vertical groove. Thus, the U-shaped support is essentially connected to the carrier elements in a snap-on connection.

Expediently, the U-shaped support has a glide surface that is hardened, preferably by anodizing.

The U-shaped support has preferably an undercut portion underneath the glide surface. The glide surface then expediently has a downwardly slanted portion in the area above the undercut portion.

Expediently, the U-shaped supports are arranged such that abutting free ends of neighboring ones of the profiled carrier elements are bridged. A length of individual ones of the U-shaped supports is identical to a length of individual ones of the profiled carrier elements.

A guide channel embodied according to the present inventive teaching has the advantage that the complete construction of a guide channel is possible with a system of prefabricated parts which allows the use of prefabricated construction parts and the adjustment and adaption of the guide channel for guiding energy chains of various sizes.

DESCRIPTION OF PREFERRED EMBODIMENTS

Figure 1:
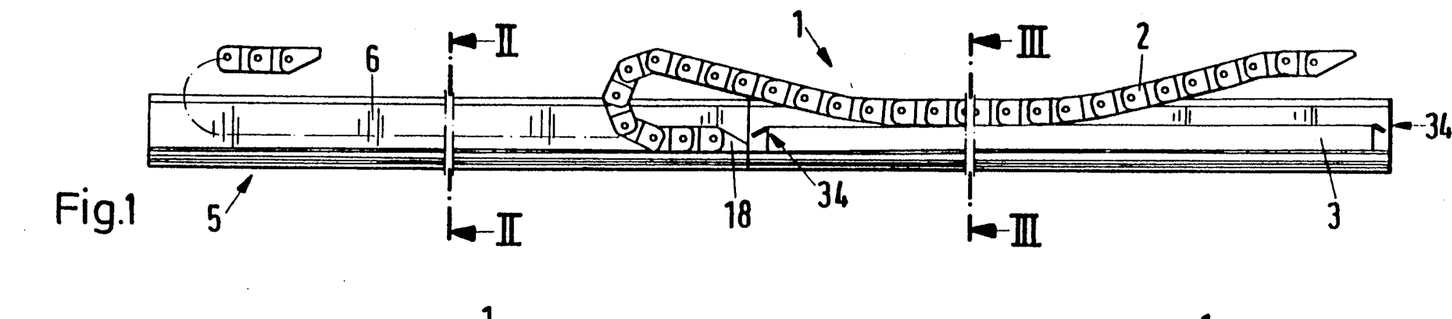
FIG. 1 is a side view of an inventive guide channel with the forward sidewall removed.
Figure 2:
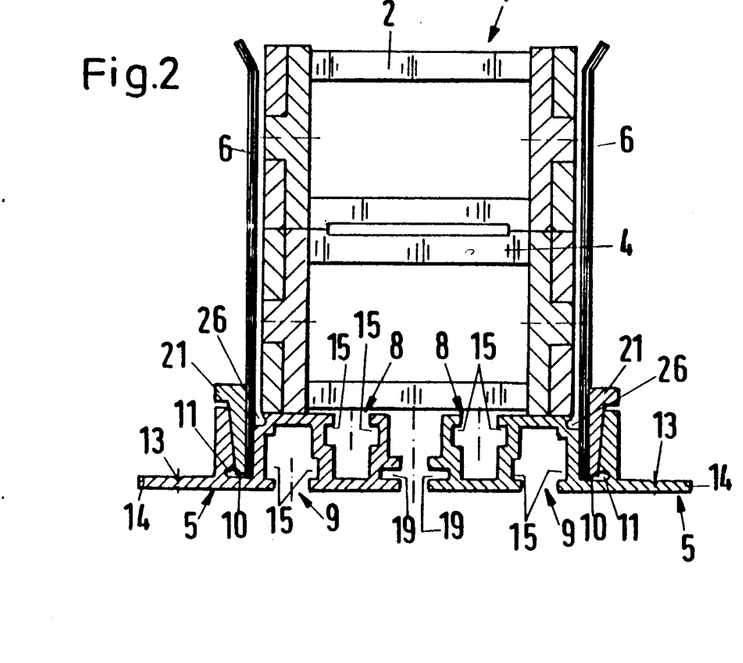
FIG. 2 shows the guide channel of FIG. 1 in a section along the line II—II.
Figure 3:
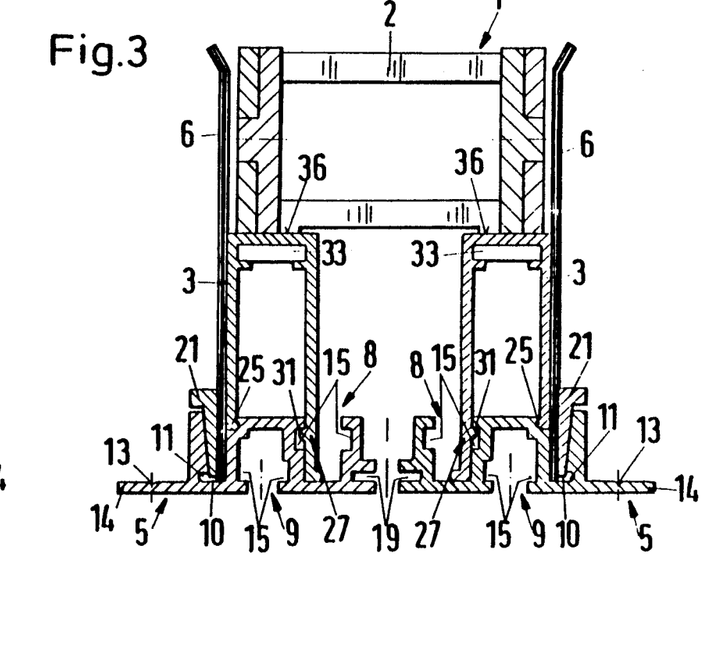
FIG. 3 shows the guide channel of FIG. 1 in a section along the line III—III.
Figures 4, 5:
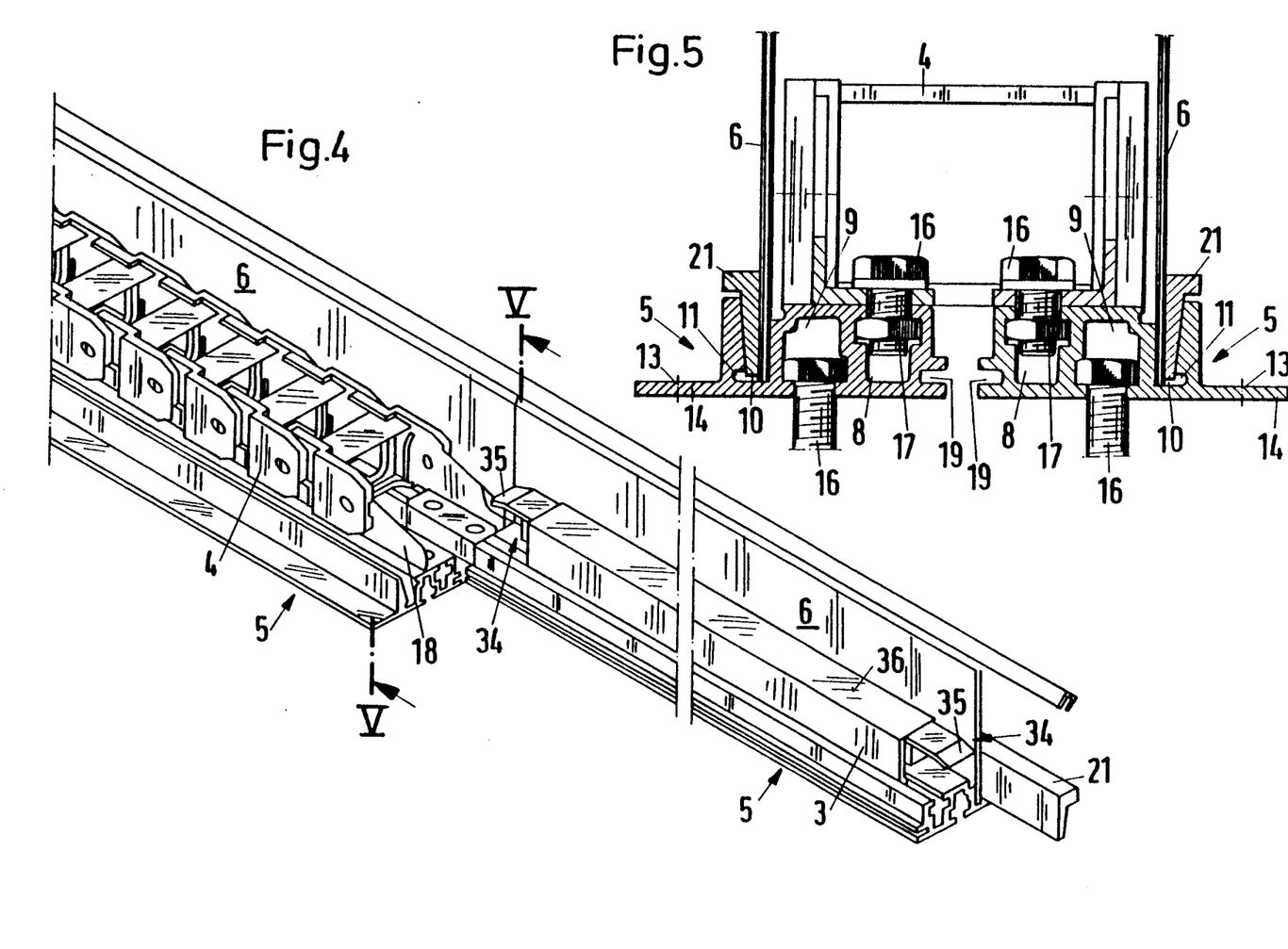
FIG. 4 is a perspective view of the inventive guide channel without its forward sidewall.
FIG. 5 shows the guide channel of FIG. 4 in a section along the line V—V.

The guide channel represented in FIG. 1 contains a guide chain 1 for guiding energy lines, the upper portion 2 of which rests on a support 3. FIGS. 2 and 3 show variations of the guiding of guide chains for energy lines 1 within a guide channel. In FIG. 2 the upper portion 2 rests on the lower portion 4, and in FIG. 3 the upper portion 2 rests on the support 3.

The guide channel is comprised of two profiled carrier elements 5 and two channel sidewalls 6 which are inserted into the carrier elements 5. The exact construction of each individual carrier element 5 can be seen in FIGS. 9 and 10.

Figure 9:
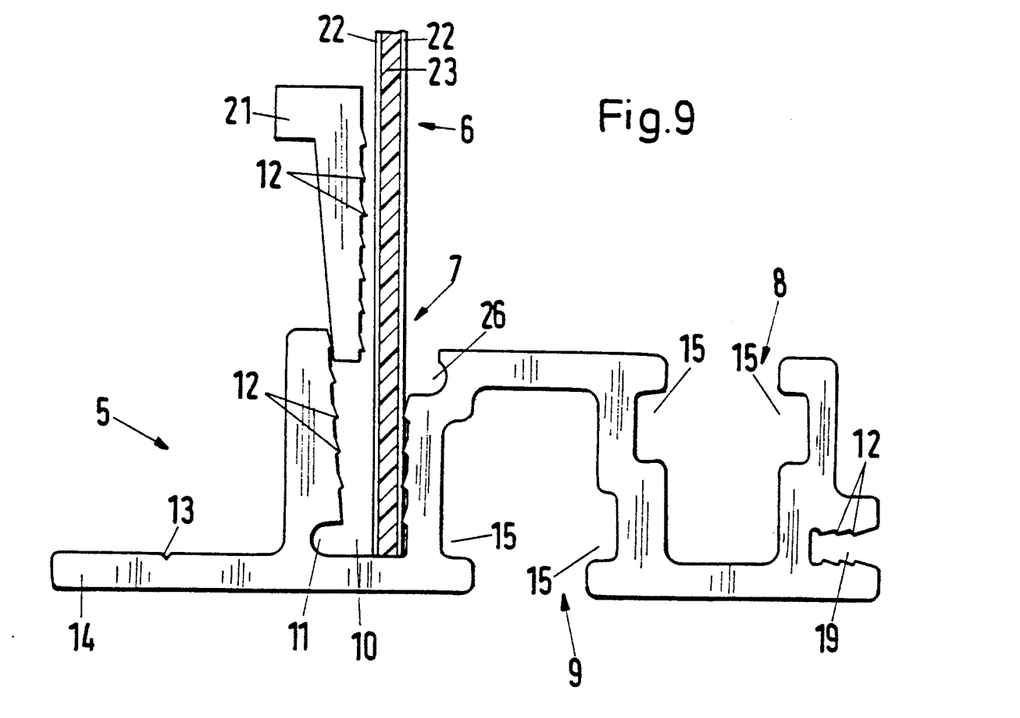
FIG. 9 shows a profiled carrier element with channel sidewalls that are not yet wedged in a cross-sectional view.
Figure 10:
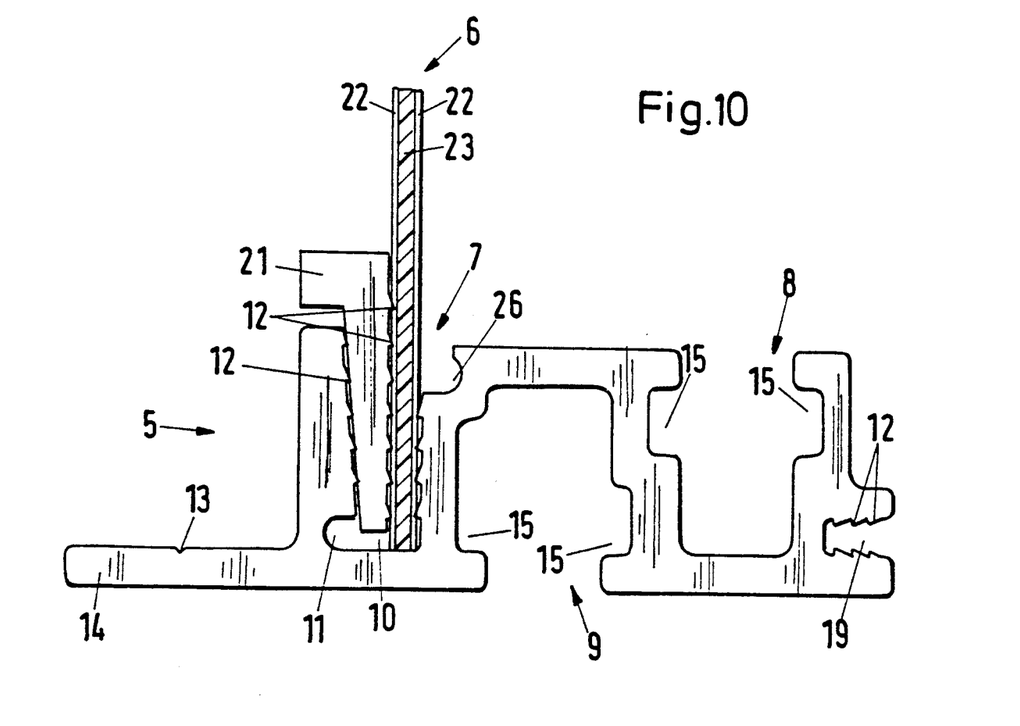
FIG. 10 is a cross-sectional view of the profiled carrier element of FIG. 9 with the channel sidewalls being wedged.

The meander-shaped profiled carrier element 5 is comprised of three U-shaped profiles 7, 8, 9 which are arranged such that two U-shaped profiles 7 and 8 open in an upward direction and the third U-shaped profile 9, connected between them, opens in a downward direction. As can be seen in FIGS. 9 and 10, the first U-shaped profile 7 is designed to receive the channel sidewalls 6 and has a wedge-shaped groove 10 for this purpose. The inner wall of the outwardly positioned leg of the U-shaped profile 7 is outwardly slanted from the base to the top, in other words, the outwardly positioned leg of the U-shaped profile 7 tapers in an upward direction. At the base of the outwardly positioned leg a cutout is provided at the inner wall so that the leg, respectively, this side of the U-shaped profile 7 is elastically movable. The lateral sides of the wedge-shaped groove 10 are provided with inwardly pointing barbs 12 which serve to fasten the channel sidewalls 6 to be inserted. The first U-shaped profile 7 further comprises a support surface 14 that is connected to the outwardly facing wall of the outwardly positioned leg. This support surface 14 has a shallow groove 13 that extends parallel to the lateral walls of the wedge-shaped groove 10.

The U-shaped profiles 8, 9 have undercuts 15 into which screws 16 or nuts 17 can be inserted in order to connect the profiled carrier element 5 to a base or a connector 18 of the guide chain 1.

At the lower outer edge of the inwardly (relative to the mirror-symmetrical arrangement) oriented U-shaped profile 8 a groove 19 is provided which has inner walls that are provided with inwardly oriented barbs 12. The groove 19 serves to receive a bottom cover plate 20 which connects the profiled carrier elements 5 that are arranged mirror-symmetrically relative to one another (or rotated by 180° relative to one another) in a common horizontal plane.

As can be seen from FIGS. 9 and 10, the channel sidewalls 6 are fastened in the wedge-shaped groove 10 with wedges 21. The barbs 12 prevent a sliding of the channel sidewalls 6 or the wedges 21 out of the wedge-shaped groove 10. The channel sidewall 6, represented in the drawing, is comprised of a composite material, namely thin cover plates 22 and an interposed plastic core 23. Due to the elastic plastic core 23 the wedging effect of the channel sidewalls 6 between the barbs 12 is increased.

Figures 6, 8:
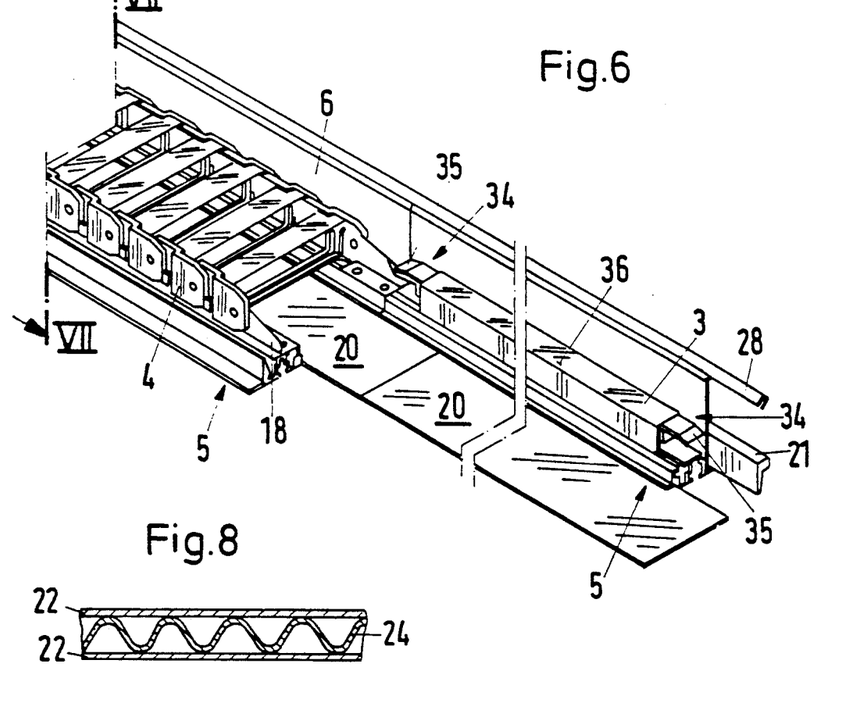
FIG. 6 shows the inventive guide channel with the cover plate, with its sidewall removed, in a perspective view.
FIG. 8 is an enlarged cross-sectional view of a sidewall or cover plate with a wave-shaped aluminum core.
Figure 7:
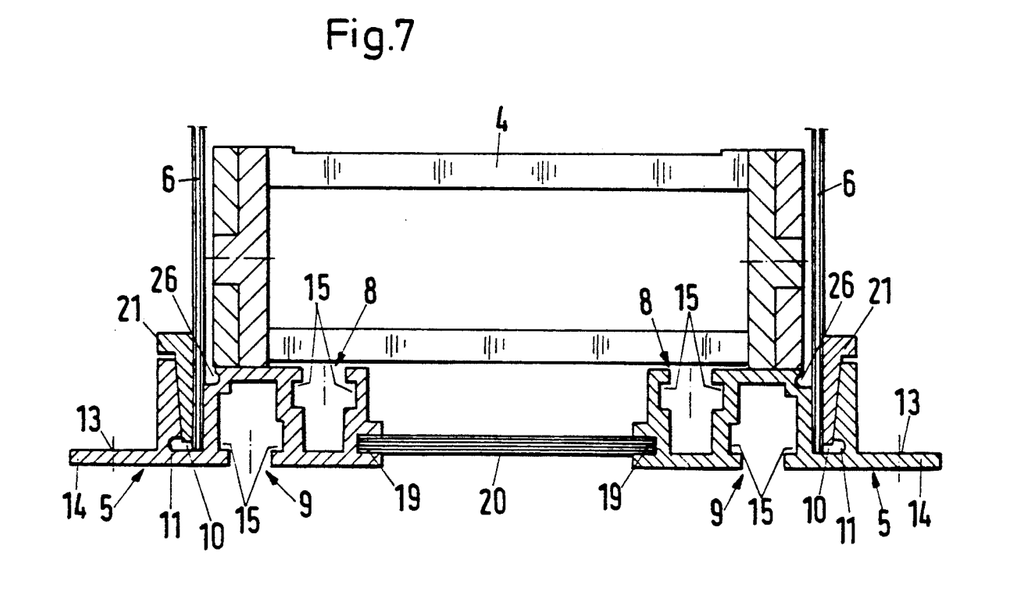
FIG. 7 is a section of the guide channel along the line VII—VII in FIG. 6.

FIG. 8 shows an alternative construction of a channel sidewall 6 or of the bottom cover plate 20. The channel sidewall 6 or the bottom cover plate 20 according to this embodiment is comprised of a plurality of layers of aluminum, preferably two thin flat cover plates 22 and a corrugated or wave-shaped aluminum core 24. In this embodiment the elasticity of the aluminum core 24 ensures a secure clamping or wedging of the channel sidewalls 6 between the barbs 12.

Figure 11:
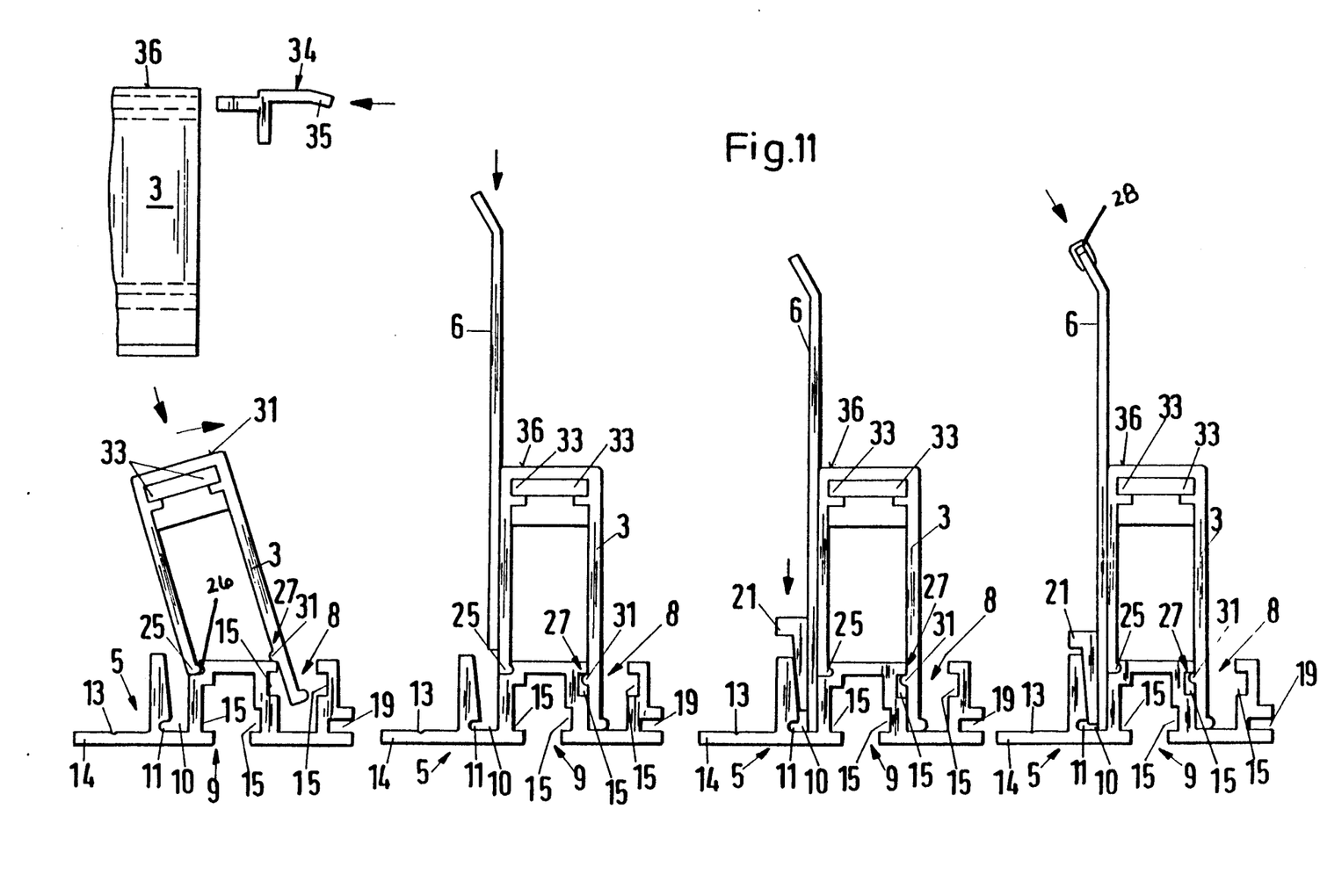
FIG. 11 shows the steps of assembling the guide channel of a first embodiment by connecting the supports, the channel sidewalls, and the guiding profile.

FIG. 11 shows the steps of assembling the guide channel from the prefabricated parts. The U-shaped supports 3 which support the upper portion 2 of the guide chain 1 are connected to the third U-shaped profile 9 with a snap-o connection. In a first step a projection 25 integral with the shorter leg of the support 3 is first inserted into a recess 26 at the transverse bar of the U-shaped profile 9 and, subsequently, the support 3 is forced over the U-shaped profile 9 until a catch 27 integrally connected to the longer leg of the support 3 engages the undercut 15 of the U-shaped profile 8. After the attachment of the supports 3 the channel sidewalls 6 can be fastened with the wedges 21. For stabilizing very tall channel sidewalls 6 U-shaped terminal elements 28 can be pushed over the outwardly bent free ends of the channel sidewalls 6.

Figure 14:
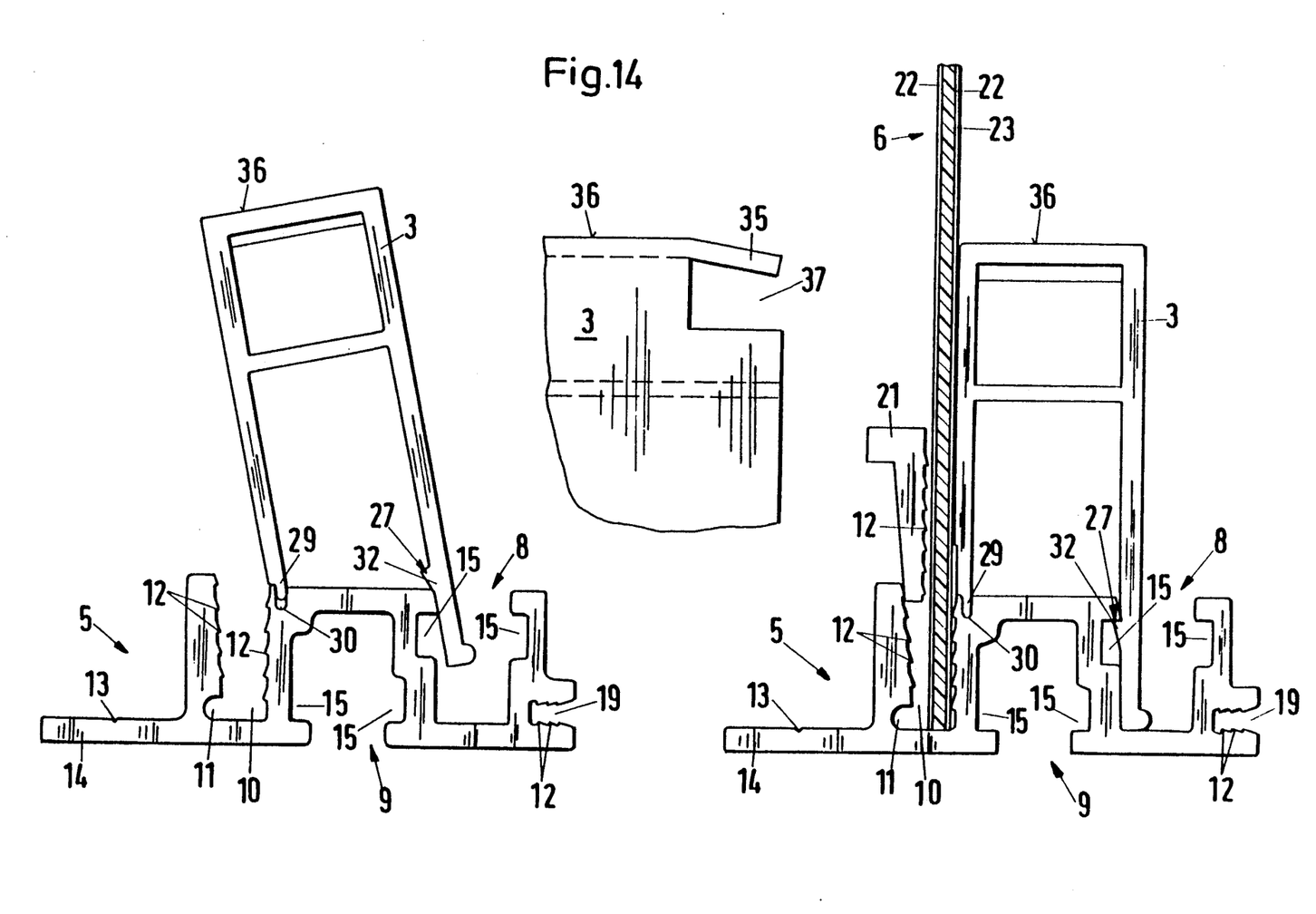
FIG. 14 demonstrates the steps for assembling the guide channel of a second embodiment by attaching the support and sidewalls.

FIG. 14 shows a second embodiment of the inventive profiled carrier element 5. In this embodiment the shorter leg of the support 3 is provided with a recessed portion 29 and is inserted into a vertical groove 30 of the U-shaped profile 9. Subsequently the support 3, as described supra, is attached via the catch 27. The catch 27 can be provided in the form of a bead portion 31 or an arresting hook 32.

Figure 12:
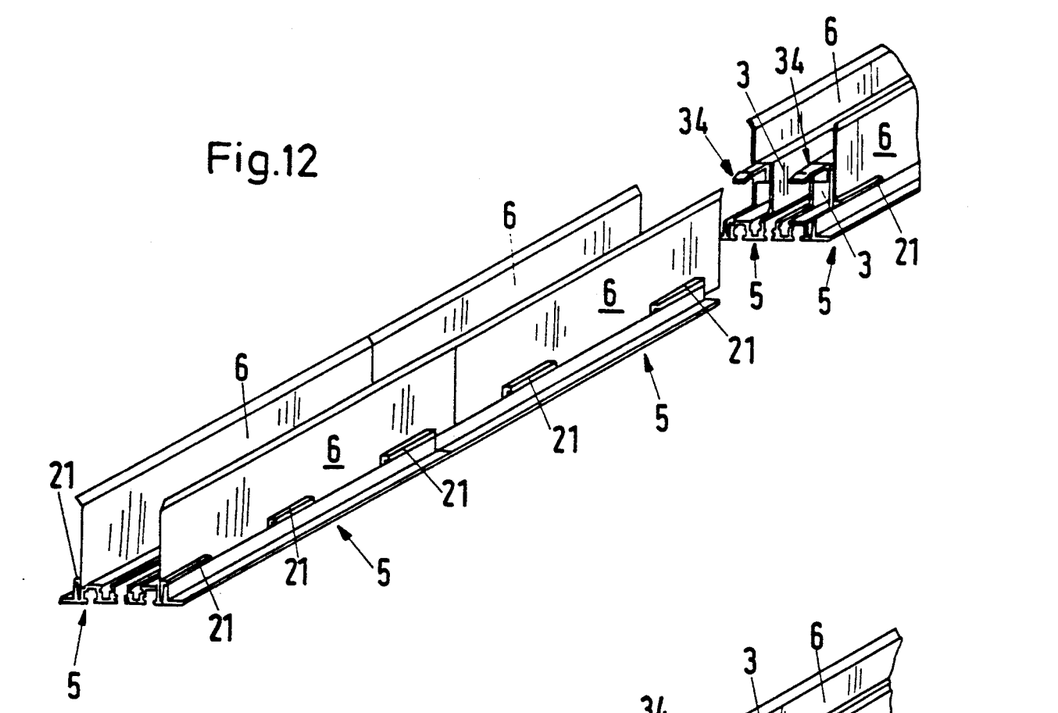
FIG. 12 shows a guide channel with staggered channel sidewalls in a perspective view.

The interior of the U-shaped support 3 has undercuts 33 at the bottom portion of the "U" (FIG. 11). These undercuts 33 serve to receive approximately T-shaped guiding profiles 34 (FIG. 12). The guiding profiles 34 are provided with downwardly bent guiding surfaces 35 (FIG. 6). These guiding surfaces 35 facilitate the gliding of the upper portion 2 of the guide chain onto the U-shaped support 3. Furthermore, no abutting edges at the transitions between neighboring U-shaped supports 3 are present.

The alternative embodiment represented in FIG. 14 shows a U-shaped support 3 with undercut portions 37 provided at the bottom portion of the "U" below the glide surface 36. The glide surface 36, positioned above the undercut portions 37 when assembled, has downwardly slanted free ends, corresponding to the aforementioned guiding surface 35.

The glide surfaces 36 of the U-shaped supports 3 are hardened, preferably anodized, in order to prevent material abrasion caused by the guide chain 1 gliding on the glide surface 36.

Figure 13:
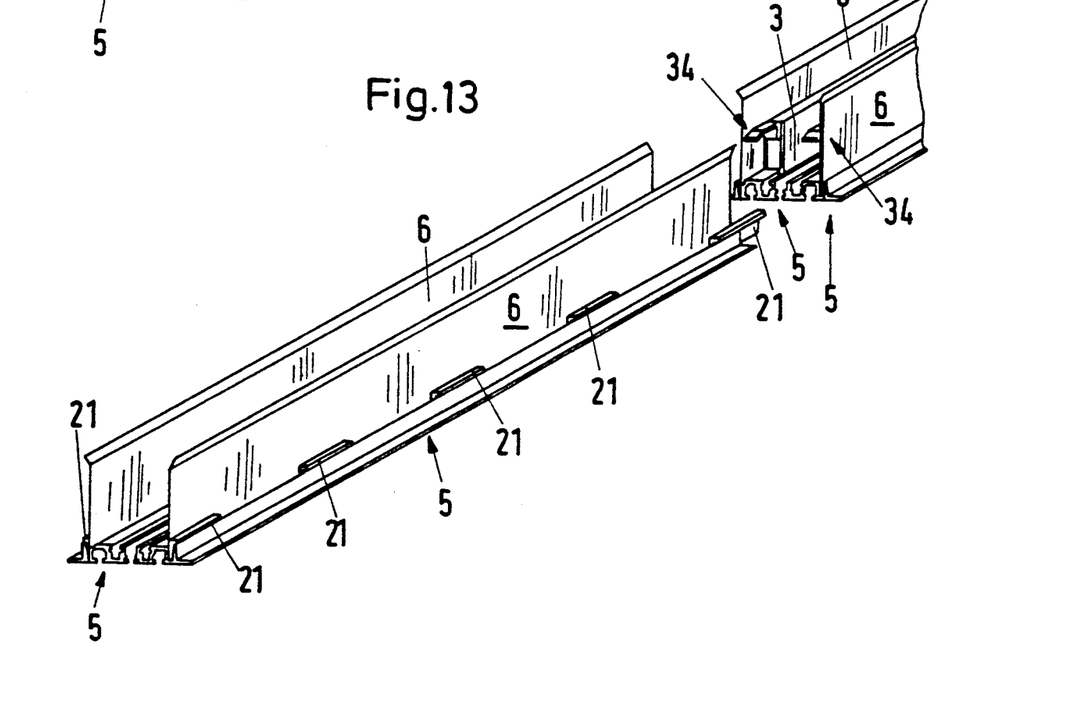
FIG. 13 shows the inventive guide channel with abutting guide walls in a perspective view.

In FIGS. 12 and 13 two variants are represented demonstrating how the channel sidewalls 6 can be connected to the profiled carrier elements 5. In FIG. 12 these channel sidewalls 6 bridge the abutting edges of the profiled carrier elements 5 and thus serve to connect the individual elements to form the guide channel. As can be seen in FIG. 13, the channel sidewalls 6 may also be flush with the free ends of the profiled carrier elements 5 so that only the wedges 21 serve to bridge the abutting free ends of the profiled carrier elements 5.

With a guide channel embodied according to the present invention it is possible in a simple manner to adapt the guide channel such that it is suitable for receiving guide chains 1 of different sizes. It is only necessary to snap the respective U-shaped support 3, selected according to the size of the guide chain to be received in the guide channel, onto the downwardly open U-shaped profile 9 and to subsequently fasten the channel sidewalls 6 of the required wall thickness and height with the respective wedges within the wedge-shaped groove 10. The basic profiled carrier elements 5 of the inventive system may be used unchanged for different guide chains 1.

The present invention is, of course, in no way restricted to the specific disclosure of the specification and drawings, but also encompasses any modifications within the scope of the appended claims.

What we claim is:

1. A guide channel for receiving and guiding guide chains for energy lines, said guide channel comprising:
   a bottom, divided in a longitudinal direction and having a width adjustable to the size of the guide chains;
   channel sidewalls of varying heights;
   said bottom comprised of two profiled carrier elements having a meander-shaped profile and in said longitudinal direction arranged in a mirror-symmetrical arrangement relative to one another in a common horizontal plane; and
   each said profiled carrier element comprised of three U-shaped profiles, with a first and a second one of said U-shaped profiles open in an upward direction and a third one of said U-shaped profiles open in a downward direction, said third U-shaped profile connected between said first and said second U-shaped profiles and said first U-shaped profile positioned outwardly relative to said mirror-symmetrical arrangement, with said channel sidewalls inserted into said first U-shaped profiles.

2. A guide channel according to claim 1, wherein said first U-shaped profile has a first outwardly positioned leg and a second inwardly positioned leg defining therebetween a wedgeshaped groove for receiving said channel sidewalls, with said first leg having an outwardly slanted inner wall.

3. A guide channel according to claim 2, further comprising wedges for fastening said channel sidewalls in said wedge-shaped groove, said wedges having a first straight lateral face with downwardly extending barbs and a second lateral face matching said outwardly slanted inner wall of said first leg.

4. A guide channel according to claim 2, wherein said channel sidewalls are fastened within said wedge-shaped grooves such that abutting free ends of adjacent ones of said profiled carrier elements are bridged in said longitudinal direction.

5. A guide channel according to claim 2, wherein said first leg has a cutout on an inwardly oriented side thereof at a base of said first leg.

6. A guide channel according to claim 2, wherein said first U-shaped profile further comprises a support surface connected to said outwardly facing wall.

7. A guide channel according to claim 6, wherein said support surface has a shallow groove extending parallel to lateral walls of said wedgeshaped groove.

8. A guide channel according to claim 2, wherein said wedge-shaped groove has lateral walls.

9. A guide channel according to claim 8, wherein said lateral walls have inwardly pointing barbs.

10. A guide channel according to claim 8, wherein one of said lateral walls neighboring said third U-shaped profile has a recess at the upper end of said lateral wall.

11. A guide channel according to claim 8, wherein one of said lateral walls adjacent to said third U-shaped profile has a vertical groove at the upper end of said lateral wall.

12. A guide channel according to claim 1, wherein each said second and said third U-shaped profiles have inner sidewalls with undercuts, said inner sidewalls facing one another.

13. A guide channel according to claim 1, further comprising a bottom cover plate connected between said second U-shaped profiles, and wherein each said second U-shaped profile has a first leg and a second leg, said first leg facing inwardly relative to said mirror-symmetrical arrangement and having a groove with inner walls for receiving said bottom cover plate.

14. A guide channel according to claim 13, wherein said bottom cover plate is made of a material selected from the group consisting of steel, aluminum, and a composite material.

15. A guide channel according to claim 14, wherein said bottom cover plate is comprised of a plurality of layers of aluminum.

16. A guide channel according to claim 15, wherein said layers of aluminum are thin flat cover layers and a corrugated aluminum core.

17. A guide channel according to claim 13, wherein said inner walls of said groove have inwardly pointing barbs.

18. A guide channel according to claim 1, wherein said channel sidewalls are made of a material selected from the group consisting of steel, aluminum, and composite material.

19. A guide channel according to claim 18, wherein said channel sidewalls are comprised of a plurality of layers of aluminum.

20. A guide channel according to claim 19, wherein said layers of aluminum ar thin flat cover layers and a corrugated aluminum core.

21. A guide channel according to claim 18, wherein said composite material comprises thin cover plates and a plastic core connected between said cover plates.

22. A guide channel according to claim 21, wherein said thin cover plates are made from aluminum.

23. A guide channel according to claim 21, wherein said plastic core is made of polyethylene.

24. A guide channel according to claim 1, wherein said channel sidewalls have outwardly bent free upper ends, and said guide channel further comprises U-shaped terminal elements connected to said free upper ends.

25. A guide channel according to claim 1, wherein said third U-shaped profile comprises a transverse bar, and said guide channel further comprises a U-shaped support with a first leg portion and a second leg portion and a bottom portion, said U-shaped support connected to said transverse bar.

26. A guide channel according to claim 25, wherein the interior of said U-shaped support has undercuts at said bottom portion.

27. A guide channel according to claim 26, further comprising an approximately T-shaped guiding profile inserted into said undercuts.

28. A guide channel according to claim 27, wherein said T-shaped guiding profile has horizontal arms and a vertical stem, said horizontal arms connected to said vertical stem so as to be staggered vertically, and said T-shaped guiding profile further comprising a downwardly slanted guiding surface connected to the upper one of said horizontal arms.

29. A guide channel according to claim 25, wherein said first leg portion is shorter than said second leg portion.

30. A guide channel according to claim 29, wherein:
said first U-shaped profile has a first leg and a second leg defining therebetween a groove with lateral walls for receiving said channel sidewalls, one of said lateral walls neighboring said third U-shaped groove having a recess at the upper end of said lateral wall;
said second U-shaped profile has an inner bottom surface and inner sidewalls with undercuts, said inner sidewalls facing one another; and
said first leg portion at a free end thereof has a projection and said second leg portion, at an inner side thereof, has a catch, said projection engaging said recess and said catch engaging said undercuts, with said second leg portion resting on said bottom surface.

31. A guide channel according to claim 30, wherein said catch is in the form of a bead portion.

32. A guide channel according to claim 30, wherein said catch is in the form of an arresting hook.

33. A guide channel according to claim 29, wherein:
said first U-shaped profile has a first leg and a second leg defining therebetween a groove with lateral walls for receiving said channel sidewalls, wherein one of said lateral walls neighboring said third U-shaped groove has a vertical groove at the upper end of said lateral wall; and said first leg portion at a free end thereof has a recessed portion engaging said vertical groove.

34. A guide channel according to claim 25, wherein said U-shaped support has a glide surface that is hardened.

35. A guide channel according to claim 34, wherein said glide surface is anodized.

36. A guide channel according to claim 34, wherein said U-shaped support has an undercut portion underneath said glide surface.

37. A guide channel according to claim 36, wherein said glide surface has a downwardly slanted guiding surface above said undercut portion.

38. A guide channel according to claim 25, wherein said U-shaped supports are arranged such that abutting free ends of neighboring ones of said profiled carrier elements are bridged.

39. A guide channel according to claim 25, wherein a length of individual ones of said U-shaped supports is identical to a length of individual ones of said profiled carrier elements.

40. A guide channel according to claim 1, wherein each of said second and said third U-shaped profiles has inner sidewalls with undercuts, said inner sidewalls facing one another, said undercuts receiving screws and nuts of connectors of the guide chains for connecting said connectors to said profiled carrier elements.

41. A guide channel according to claim 1, wherein each of said second and said third U-shaped profiles has inner sidewalls with undercuts, said inner sidewalls facing one another, said undercuts receiving screws and nuts for connecting said profiled carrier elements to a base.

42. A guide channel according to claim 1, wherein a length of individual ones of said channel sidewalls is identical to a length of individual ones of said profiled carrier elements.

* * * * *